United States Patent
Anderson et al.

(10) Patent No.: US 6,933,919 B1
(45) Date of Patent: Aug. 23, 2005

(54) POINTING DEVICE WITH STORAGE

(75) Inventors: Glen J. Anderson, Sioux City, IA (US); James Foster Knutson, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/204,837

(22) Filed: Dec. 3, 1998

(51) Int. Cl.$^7$ .............................................. G09G 5/00
(52) U.S. Cl. ........................ 345/156; 345/158; 345/204
(58) Field of Search ............................... 345/156, 173, 345/157, 158

(56) References Cited

U.S. PATENT DOCUMENTS

| | | | | |
|---|---|---|---|---|
| 4,578,674 A | | 3/1986 | Baker et al. ................. | 340/710 |
| 4,754,268 A | | 6/1988 | Mori ........................... | 340/710 |
| 5,065,360 A | | 11/1991 | Kelly ........................... | 395/800 |
| 5,179,655 A | * | 1/1993 | Noguchi et al. ............ | 359/158 |
| 5,349,139 A | | 9/1994 | Verrier et al. .................. | 178/19 |
| 5,469,193 A | | 11/1995 | Giobbi ........................ | 345/158 |
| 5,574,480 A | | 11/1996 | Pranger et al. ............. | 345/166 |
| 5,581,783 A | | 12/1996 | Ohashi ........................ | 395/825 |
| 5,640,592 A | | 6/1997 | Rao ............................ | 395/825 |
| 5,672,852 A | | 9/1997 | Fukuzaki et al. .............. | 178/19 |
| 5,729,220 A | | 3/1998 | Russell ......................... | 341/22 |
| 5,844,547 A | * | 12/1998 | Minakuchi et al. .......... | 345/173 |
| 5,877,745 A | * | 3/1999 | Beeteson et al. ............ | 345/156 |
| 6,016,478 A | * | 1/2000 | Zhang et al. ................... | 705/9 |
| 6,016,520 A | * | 1/2000 | Facq et al. ..................... | 710/33 |
| 6,326,952 B1 | * | 12/2001 | Amro et al. ................. | 345/168 |
| 6,326,953 B1 | * | 12/2001 | Wana .......................... | 345/168 |

* cited by examiner

*Primary Examiner*—Alexander Eisen
*Assistant Examiner*—Kimnhung Nguyen
(74) *Attorney, Agent, or Firm*—Chad W. Swantz; Suiter West Swantz PC LLO

(57) ABSTRACT

A computer pointing device employs memory for the storage of data allowing information to be copied from one computer to another without the need for a network or removable media such as a floppy disk. In a first aspect, the pointing device may be linked to multiple computers wherein the connection to the pointing device may be toggled from one computer to another. The connection method may be via a cabled interface or wireless interface, such as a radio frequency link. In a second aspect, the device may by physically moved from one computer to another. In a preferred embodiment, the pointing device is a universal serial bus device.

18 Claims, 3 Drawing Sheets

POINTING DEVICE WITH STORAGE

FIELD OF THE INVENTION

The present invention relates generally to a computer pointing device and, more particularly, to a computer pointing device having memory for storage of data and for transfer of data across multiple computers.

BACKGROUND OF THE INVENTION

The prevalence of graphical user interfaces (GUIs) virtually demands the use of a mouse or other pointing device in addition to a keyboard. Many types of pointing devices are generally known in the art. A mouse uses a roller ball and rollers for translating X- and Y-axis movement, e.g., via an optical or opto-mechanical mechanism. A mouse will typically have a hand-sized housing and is operated by moving the mouse around on a flat surface such as a desktop or mouse pad. In addition to the mouse, other types of pointing devices such as the trackball and touchpad are known in the art. A trackball is essentially the same as the mouse in terms of design, functionality, and electrical interface, but is used upside down. Rather than moving the entire device, the device is stationary with the roller ball facing upward wherein the ball may be turned with the hand directly. Touchpads are very intuitive pointing devices, employing a flat, rectangular, stationary sensing plane that tracks the X-Y position of a user's finger or stylus on the sensing plane. Touchpads typically employ a grid or matrix of capacitance sensors underneath a protective surface. Touchpads responding to direct pressure, e.g., using layered conductive or resistive sheets, are also known.

In some computing situations, a person may use or otherwise by responsible for managing files on two or more computers. In such instances, the need for transferring data from one computer to another may arise, such as when updating or synchronizing files across multiple computers or when copying and pasting data from one computer to another is desired. Transferring data across multiple computers may be accomplished by networking the computers or by using a floppy disk drive or other removable storage device.

Data can be shared across multiple computers if the computers are networked. One method of networking is a direct cable connection between the serial or parallel ports of two computers. This, however, requires a specialized cable and ties up a serial or parallel port on the computers. Another method of connecting multiple computers is through the use of network adapter cards. However, network adapter cards require installation and an available bus slot.

Data may also be shared across multiple computers through the use of removable storage media. For example, the majority of computers have a floppy disk drive. However, the capacity of floppy disks is limited and may be insufficient for large files, such as graphics files. Also, the data transfer rate may be less than desirable. Transferring files on floppy disks may require the use of additional software applications, for example, to compress files or to enable large files to be written across and read from multiple floppy disks. Large capacity removable media are also known, however, their use requires that each computer be equipped with the appropriate drive. External drives are also known, however, the entire drive and any power supply must be moved from computer to computer.

It would, therefore, be desirable to provide a device that provides pointer control input and also allows the transfer of data across multiple computers in a manner that is more convenient than using removable storage media and without requiring a network.

SUMMARY OF THE INVENTION

The present invention provides a computer pointing device and an improved method for the transfer of data between multiple computers. The computer pointing device employs memory for the storage of data allowing information to be copied from one computer to another without the need for a network or removable media such as a floppy disk. In this manner, files can be conveniently transferred across multiple computers. For example, data may be input or created on one computer and then transferred (e.g., for further editing or output) to another computer having desired software installed thereon or having a desired peripheral such as a printer attached thereto. Also, files existing in multiple versions may be updated and synchronized across multiple computers.

In a first aspect of the invention, the pointing device may be linked to multiple computers wherein the connection to the pointing device may be toggled from one computer to another. The connection method could be via a cabled interface or wireless interface such as an infrared (IR) or radio frequency (RF) link.

In a second aspect of the invention, the device is physically moved from one computer to another. In a preferred embodiment, the pointing device according to the present invention may be connected to the Universal Serial Bus (USB) port on a computer system. In this manner, the operator may copy information from a first computer to the memory of the pointing device and may unplug the device and plug it into the USB port of another computer, and then copy the information to the other computer. In this aspect of the invention, the pointing device serves the same function as a removable medium, but does not require that each computer be equipped with a special drive.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
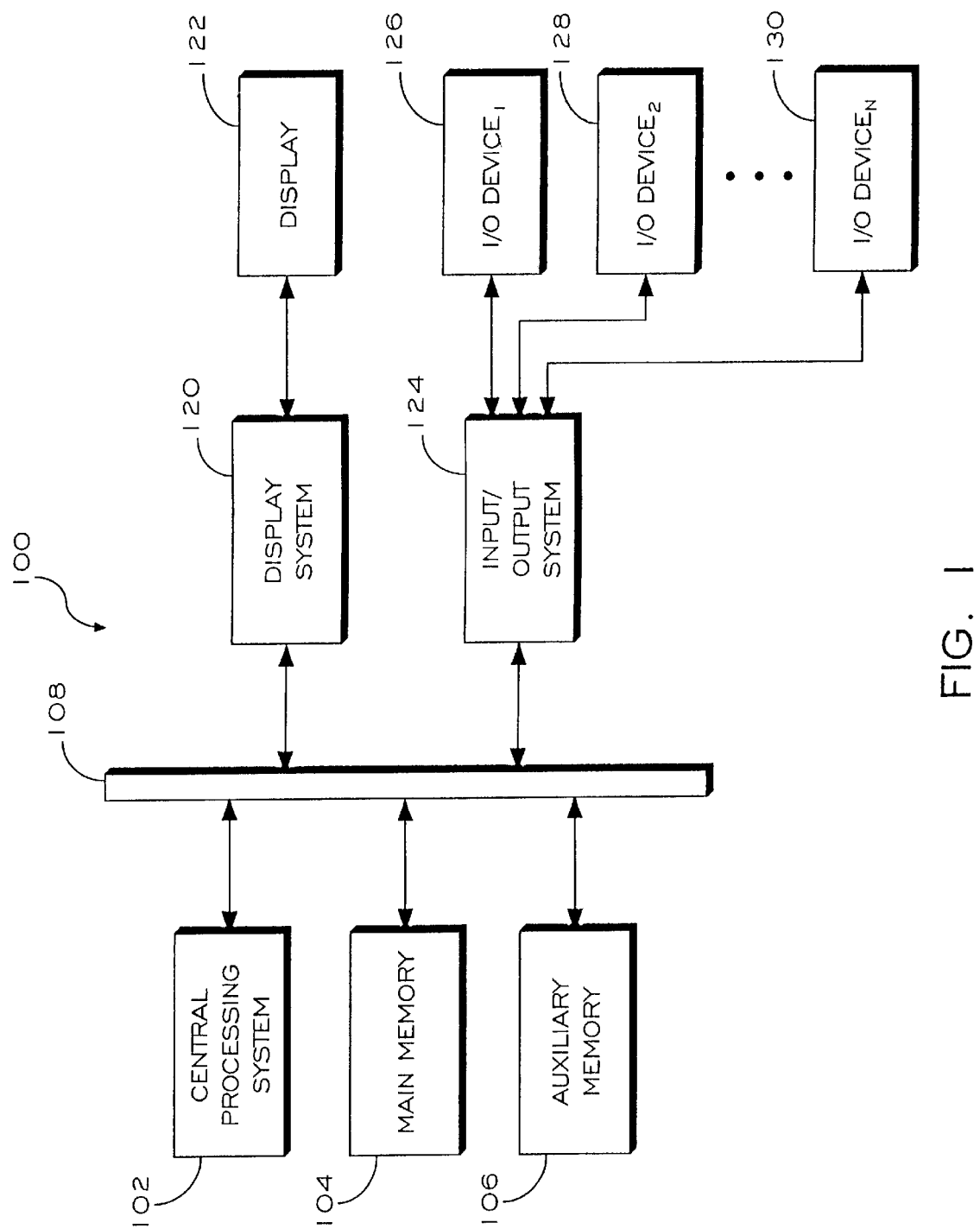
FIG. 1 is a block diagram of an exemplary computer system operable to embody the present invention.

Referring now to FIG. 1, a hardware system in accordance with the present invention is shown. The hardware system 100 shown in FIG. 1 is generally representative of the hardware architecture of a computer-based information handling system of the present invention. The hardware system 100 is controlled by a central processing system 102. The central processing system 102 includes a central processing unit such as a microprocessor or microcontroller for executing programs, performing data manipulations and controlling the tasks of the hardware system 100. Communication with the central processor 102 is implemented through a system bus 108 for transferring information among the components of the hardware system 100. The bus 108 may include a data channel for facilitating information transfer between storage and other peripheral components of the hardware system. The bus 108 further provides the set of signals required for communication with the central processing system 102 including a data bus, address bus, and control bus. The bus 108 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 100 include main memory 104, and auxiliary memory 106. The hardware system 100 may further include an auxiliary processing system (not shown) as required. The main memory 104 provides storage of instructions and data for programs executing on the central processing system 102. The main memory 104 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and so on. The auxiliary memory 106 provides storage of instructions and data that are loaded into the main memory 104 before execution. The auxiliary memory 106 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 106 may also include a variety of nonsemiconductor-based memories, including but not limited to magnetic tape, drum, floppy disk, hard disk, optical laser disc, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 100 may optionally include an auxiliary processing system (not shown) which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. Such processors may be, for example, an auxiliary processor to manage input/output, an auxiliary processor to perform floating point mathematical operations, a digital signal processor (a special-purpose microprocessor having an architecture suitable for fast execution of signal processing algorithms), and so forth. It will be recognized that such auxiliary processors may be discrete processors or may be built in to the main processor.

The hardware system 100 further includes a display system 120 for connecting to a display device 122, and an input/output (I/O) system 124 for connecting to one or more I/O devices 126, 128, up to N number of I/O devices 130. The display system 120 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The display device 122 may comprise a cathode ray-tube (CRT) type display such as a monitor or television, or may comprise an alternative type of display technology such as a liquid-crystal display (LCD), light-emitting diode (LED) display, gas or plasma display, electroluminescent display, vacuum fluorescent display, or cathodoluminescent (field emission) display. The input/output system 124 may comprise one or more controllers or adapters for providing interface functions between the one or more I/O devices 126–130. For example, the input/output system 124 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 124 and I/O devices 126–130 may provide or receive analog or digital signals for communication between the hardware system 100 of the present invention and external devices, networks, or information sources. The input/output system 124 and I/O devices 126–130 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), symmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

Figure 2:
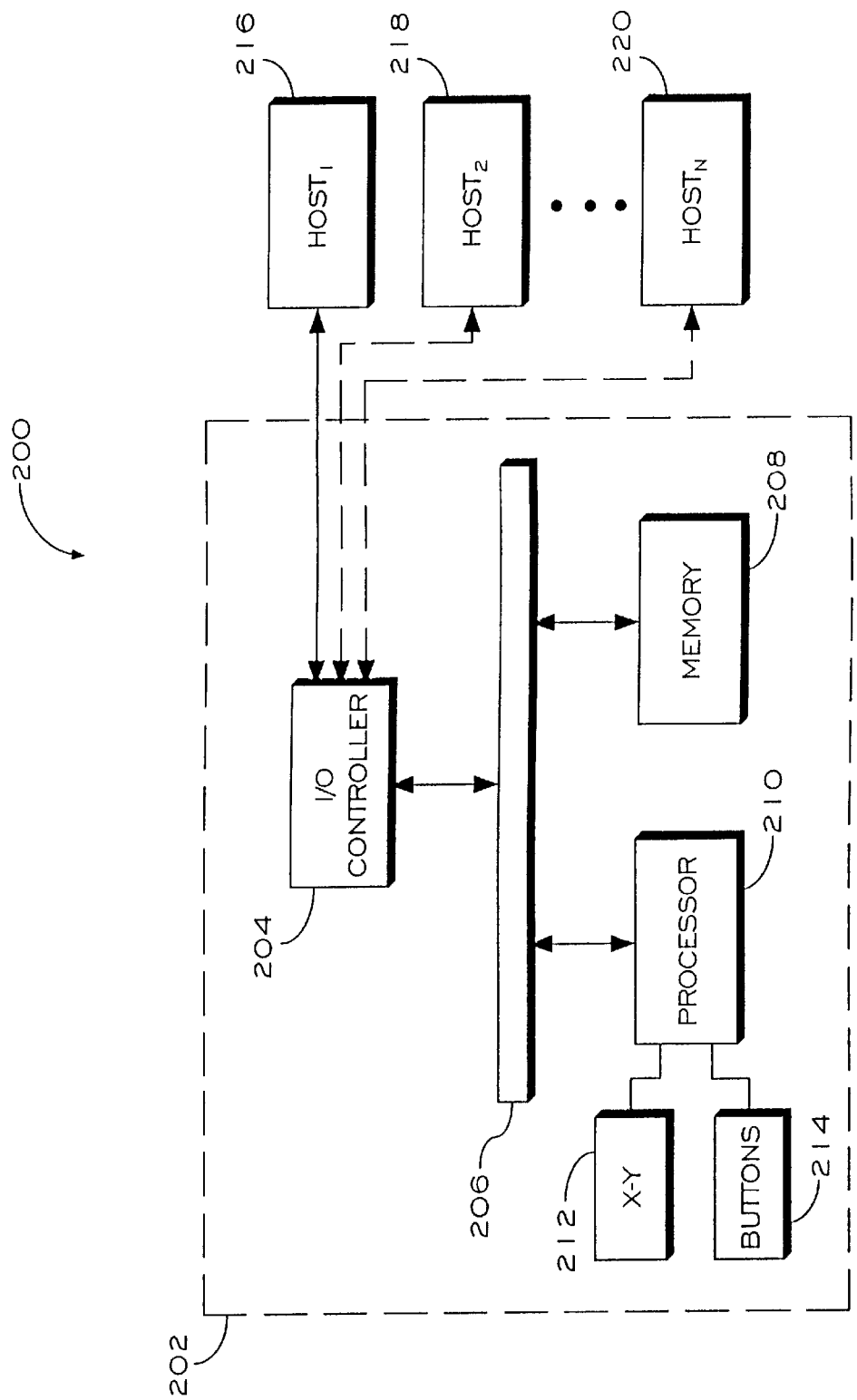
FIG. 2 is a block diagram illustrating the pointing device with storage according to the present invention and showing its use to control multiple host computer systems.

FIG. 2 illustrates the basic architecture of a system 200 employing a pointing device with storage 202 according to the present invention wherein the device 202 may be used to provide input to, and to transfer data between, two or more host computer systems 216, 218, up to N number of host systems 220. The device 202 comprises an I/O controller 204, a data bus 206, memory 208, and hardware for generating pointing data. The hardware for generating pointing data includes a spatial position tracking mechanism 212, one or more buttons 214 or other mechanism for generating mouse clicks, and a processor 210. Although spatial tracking mechanism 212 will primarily be referred to herein with respect to X-Y position tracking, it will be recognized that such is also intended to include three-dimensional position tracking devices, such as devices employing inertial sensors, strain sensors, and the like.

Device 202 has both data storage and pointing functions. Referring now to the pointing function of device 202, X-Y position tracking mechanism 212 converts X- and Y-displacement into an electrical signal. Mechanism 212 may be, for example, of the type employed in a conventional mouse, such as an opto-mechanical system which employs a disk with radial slits that rotates in response to roller ball movement and that is disposed between a light source and a light detector. Mechanism 212 may also be an optical system which requires the device to be used on a special pad having a grid of alternating reflectances. Device 202 is preferably housed in a generally hand-sized housing and generates pointing data in the same manner as a conventional mouse. However, it will be recognized that other mechanisms for generating pointing data may also be employed, such as a trackball, touchpad, digitizing tablet, and the like. A trackball is essentially an upside down mouse wherein the roller ball is manipulated directly by the user's hand. A touchpad detects the movement of a finger or stylus on a sensing plane. Touchpads typically employ a grid or matrix of capacitance sensors underneath a protective surface, although touchpads responding to direct pressure, e.g., using layered conductive or resistive sheets, are also known. Touchpads are generally used as relative positioning devices. Digitizing tablets also detect the movement of a stylus on a sensing plane and are usually configured as absolute positioning devices wherein each location on the sensing plane corresponds to a particular on-screen location.

Processor 210 converts the electrical signals from the X-Y tracking mechanism 212 and the buttons 214 into X-Y displacement and button state information, collectively referred to herein as "pointing data." The pointing data may then be transferred to I/O controller 204 via bus 206. Alternatively, in an embodiment not shown, the raw electrical signals from X-Y displacement mechanism 212 and buttons 214 may be fed directly to I/O controller 204 which may incorporate the function of processor 210 for generating pointing data. It will be appreciated that where the pointing device is of the touchpad type, mouse click information may be generated by buttons (switches), finger gestures on the pad, and combinations thereof.

The device and method according to the present invention preferably use conventional methods for encoding and decoding pointing data. Pointing data is typically into three byte words generally representative of button state information, X-displacement, and Y-displacement, wherein each byte is 11 bits in length, including 8 data bits plus framing and control bits.

Referring now to the data storage function of device 202, I/O controller 204 is responsible for receiving data such as data files or clipboard data from a host system, e.g., host system 216 and transferring it to memory 208 via bus 206. I/O controller 204 is also responsible for reading the contents of memory 208 and transferring output to a host system, e.g., one or more of host systems 218–220. Memory 208 may be, for example, any rewritable nonvolatile memory such as EEPROM, flash memory, or the like. Alternatively, memory 208 may be volatile RAM such as DRAM. When volatile memory is employed, device 202 may contain a battery (not shown) or otherwise receive power to preserve the data stored in memory 208.

Pointing data and file/clipboard data may be passed through a serial connection, such as a serial port (RS-232), a USB port, or the like. Alternatively, the connection between host computer system and the pointing and storage device according to the present invention may be a bidirectional parallel port connection. A parallel connection may support any industry standard parallel port operation, such as IBM Type 1, IBM Type 3, Enhanced Parallel Port (EPP), Enhanced Capabilities Port (ECP), IEEE 1284, and so on, and is preferably a connection that supports both EPP and ECP operation. The connection may be a cabled connection, or may be a wireless connection, such as an RF or IR link. Each of the host systems 216–220 requires a device driver to sort incoming and outgoing data and to turn control of the system over to the device 202. The file transfer function and the cursor control function preferably alternate in their usage of the connection thus eliminating the need for a synchronous transfer for the two file types.

Memory 208 may be utilized by the host systems 216–220 in a number of ways, and the manner of use in preferably user selectable. For example, memory 208 may be utilized as (1) a clipboard resource for temporary data storage for cut, copy, and paste events; (2) a permanent storage media, for example, using commands, file operations, and file system, etc., in a manner as would be conventional for a disk drive; (3) as an extension or upgrade to the main system RAM, directing data to and from memory 208 instead of regular system RAM 104 (FIG. 1); or (4) any combination of the above.

By "clipboard" is meant any memory resource into which selected or highlighted data such as text or graphics may be stored in response to a cut or copy event and inserted into a program environment at the location of a cursor, pointer, or insertion point in response to a paste event. Cut, copy, and paste operations are generally known in the art. A cut operation removes a part of a document, such as a highlighted or selected portion, and places it in memory. A copy operation is similar to a cut operation, except the highlighted or selected portion is not removed from the document. The cut or copied material in memory may then be pasted elsewhere, such as in another location in the document or in another document. The clipboard data is typically temporary and is overwritten when subsequent cut or copy events occur, although clipboard resources which may be appended rather than overwritten by newly cut or copied data are also known in the art.

It may be desirable to store clipboard data in main memory 104 (FIG. 1) as well as in memory 208. In this manner, the stored clipboard data remains in the memory of the host system and may later be pasted into the host system after the input/output device 202 according to the present invention is removed. If clipboard memory data already exists in the main memory of a host system when the device 202 according to the present invention is attached, any clipboard data contained in memory 208 of the device will take precedence in subsequent paste operations.

When storing data as files, the memory 208 may be used for data file storage in the same manner as a disk drive, such as a hard disk or removable disk media. When memory 208 is used as an extension of the main system RAM, the device driver may direct overflow from main memory 104 (FIG. 1) into memory 208. Using memory 208 as an extension of main system RAM is advantageous only where the memory 208 can be accessed faster than a swap file on hard disk drive in a system employing conventional hard disk drive-based virtual memory. As such, the driver may use factors such as hard disk drive access time, free space, and data transfer rate, as well as the bandwidth of the connection used by device 202, the number of other devices sharing the connection used by device 202, the amount of traffic on the connection used by device 202, and so on, to determine whether overflow from system RAM will be directed to memory 208 or to a swap file created on the hard drive.

In a preferred embodiment according to the present invention, device 202 is connected to a host system via a wireless link, such as an IR link, or most preferably an RF link. Device 202 and each host system to be controlled have a suitable RF transceiver for the input and output of data as would be understood by those skilled in the art. The use of an RF link is advantageous in that it is not necessary to physically disconnect the device 202 from one host and connect it to another in order to transfer data between computers. When device 202 is connected to host 216 as depicted in FIG. 2, device 202 functions as a pointing device for host 216. Data such as a data file or clipboard contents moved into memory as a result of a cut or copy command may be transferred to memory 208. If it is desired to transfer such data to another computer such as host 218–220 a command may be sent to toggle the connection from host 216 to the desired host 218–220. Preferably, a host selection switch is provided on the housing of device 202. In this manner, one of hosts 218–220 may be selected and the pointing and storage device according to the present invention will then provide cursor control for the selected host. After the device is toggled to control a different host, a paste event occurring on the newly selected host will cause device 202 to write the clipboard contents in memory 208 to the host. A cut or copy event will cause any selected or highlighted content to be written to the memory 208 of device 202. The cut or copied contents may overwrite any contents existing in memory 208 or may be appended thereto, preferably according to a user selectable option.

When the link is an IR link, the device preferably uses established communication standards as promulgated by the Infrared Data Association (IrDA). As will be recognized, when an IR link is employed, a toggle as described above in connection with an RF link is not necessary since, for IR transmission, a line of sight will generally be required between the transmitter/receiver of the host system and the transmitter/receiver of the device according to the present invention. Accordingly, a user may change host system in communication with the device according to the present invention simply by relocating the device so as to provide a line of sight between the device and the transmitter/receiver of the desired host system.

When device 202 is not attached to or controlling a particular host, the device driver according to the particular invention allows cut, copy, and paste events to be stored in the main system memory 104 (FIG. 1) in the conventional manner. When an RF link is used, the device may be allowed to write the contents of memory 208 to multiple computers simultaneously. In this manner the present invention allows data from one computer and distributed to any number of other computers thus facilitating the distribution or synchronization of computer files or data without the need for an operating network. Preferably, when data is transferred to multiple systems, cursor control will be suppressed on all but one system to prevent errant mouse data, such as inadvertent mouse clicks and the like.

In another embodiment according to the present invention, the device 202 may employ a cabled connection to a host, e.g., host 216 as indicated in FIG. 2. Data may be transferred to memory 208 from host 216 as described above, i.e., in the form of clipboard data or data files. After the data is stored in memory 208, the device 202 may be removed from host 216 and may be connected to another host 218–220 for the download of stored data to the new host and/or uploading any new data to memory 208. The connection may be via a serial port or parallel port, preferably a serial port, and most preferably a USB port. USB provides a hot swap capability so that the device may be attached and removed without shutting down the host system. Also, where a USB hub or hub peripheral is present on a host system, a user need not plug the device directly into the USB port on the host computer, and the connection may be made on the desktop using any available USB port on a hub or hub peripheral.

Figure 3:
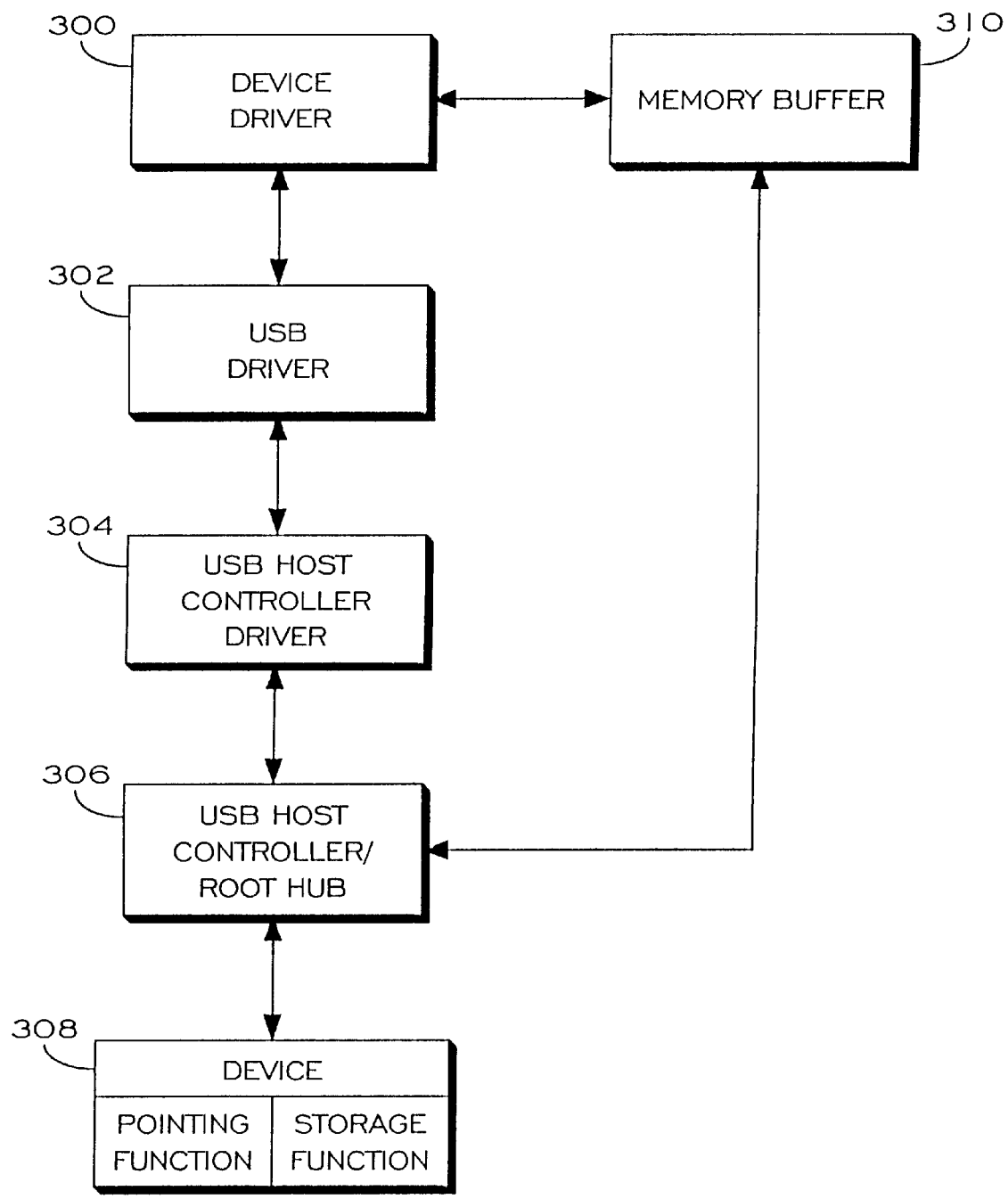
FIG. 3 is a block diagram illustrating a preferred embodiment wherein the pointing device with storage is implemented as a universal serial bus (USB) device.

FIG. 3 depicts a preferred embodiment wherein the pointing device with storage is a USB device. The USB is a serial bus having a bandwidth of 12 Mbits per second that uses a tiered star topology, so that each device attached to the USB has a direct connection with, and is controlled by, the host computer. The USB uses 7 bit addressing and thus can simultaneously connect up to 127 peripheral devices. Although FIG. 3 depicts the device 308 according to the present invention as being connected to the root hub of the USB host controller 306, it will be recognized that the device 308 may be employed anywhere within the USB topology.

Device driver 300 running on a host system issues requests to the USB driver via I/O Request Packets (IRPs) which initiate transfers to and from the device 308. The driver 300 establishes an IRP and supplies a memory buffer 310 to store data to be transferred to device 308 and/or to store any data which will be returned from device 308.

USB driver 302 may be incorporated into the operating system or may be a separately loadable device driver (system extension). When an IRP is received by the USB driver 302 from device driver 300, USB driver 302 organizes the request into individual transactions that will be executed in a series of transaction frames.

USB host controller driver (HCD) 304 schedules the transactions to be broadcast over the USB. The scheduling performed by HCD 304 will depend on the type of transaction, transfer requirements of the device 308, transaction traffic of other USB devices, etc.

The host controller/root hub 306 initiates the transactions scheduled by HCD 304. Host controller/root hub 306 obtains data from the memory buffer 310 supplied by driver 300, performs a parallel to serial conversion on the data, creates the transactions, and transmits the data over the USB. All devices are configured with a unique address and although all enabled devices will see the broadcast data, a device will respond only to data addressed to it.

Both read and write operations are generated by the device driver 300. If writing data to the device 308 is required, the host controller reads data from memory buffer 310 and forwards it to the root hub to be sent over the USB. Similarly, if a read transaction is required by the driver 300, a read transaction is built by the host controller and is forwarded it to device 208 via the root hub. The device 308 then sends data back to the root hub which forwards it to the host controller. The host controller performs a serial to parallel conversion on the data and transfers the data to memory buffer 310.

In this manner, a user may perform a cut or copy operation to store clipboard data, or save data as a data file, in memory 208 (FIG. 2). If it is desired to transfer this data to another computer, the device 308 is simply unplugged from the host and plugged into any a USB port (either the root hub or any other hub on the USB system) another host. The present invention is particularly advantageously implemented as a USB device since the USB supports dynamic attachment and removal. As stated above, a user need not attach and detach the device directly to and from the computer, but rather, may do so to and from any available port on a hub device which may be more conveniently located.

The device 308 according to the present invention may be implemented as a USB device in a number of ways. For example, the device 308 may be configured as a compound hub containing embedded pointing and storage functions. A compound device is a single physical package implementing an embedded hub as well as the pointing function and the storage function. The device may be attached to the host system with a single USB cable and appears to the host as a hub with two permanently attached USB devices. Alternatively, the device 308 may be configured as a simple device having the storage function and the pointer function being controlled by the same instance of a device driver. Also, the device 308 may be configured as a composite device with each functional interface being controlled by different (instances of) device drivers.

The device 308 may contain separate configuration options or descriptors, with each configuration describing a different functional interface and endpoints therefore. The USB driver 302 allows modification of the configuration by adjusting settings associated with a given interface or by selecting an entirely different configuration. Since a single configuration may implement a plurality of interfaces, the device may also employ a single configuration descriptor that defines both the storage function interface and endpoints and the pointer function interface and endpoints.

The pointing function preferably operates on the low speed (1.5 Mbits per second) USB subchannel using interrupt type transfers. The storage function preferably uses high speed transfers of either the control or bulk type.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disc for utilization in a CD-ROM drive, a magnetic media for utilization in a magnetic media drive, a magneto-optical disk for utilization in a magneto-optical drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carriers computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A computer-based information handling system comprising at least two computer systems and an input/output device operably connected to one of at least two computer systems, said input/output device comprising:
   pointing device for generating an electrical signal encoding spatial position information and command information;
   memory for storing machine readable data;
   a controller operably connected to said pointing device and said memory; and
   means for switching communication with said input/output device from a first computer system to a second computer system, wherein said controller is capable of transferring data from said pointing device to said first and second computer systems, and wherein said controller is further capable of sending and receiving data to and from said first and second computer systems, said input/output device being connected to said first and second computer systems via a wireless link.

2. The computer-based information handling system according to claim 1 wherein said pointing device comprises an optical or opto-mechanical roller-ball mechanism.

3. The computer-based information handling system according to claim 1 wherein said pointing device comprises a touchpad pointing device.

4. The computer-based information handling system according to claim 1 wherein the memory of said input/output device is nonvolatile memory.

5. The computer-based information handling system according to claim 4 wherein said memory is flash memory.

6. The computer-based information handling system according to claim 1 wherein said input/output device and said computer system are operably connected via a serial link.

7. The computer-based information handling system according to claim 1 wherein said means for switching the communication with said input/output device comprises a switch located on a surface of said input/output device for sending a command to said first computer system to cause said first computer system to disable communication between said input/output device and said first computer system and sending a command to said second computer system to cause said second computer system to enable communication between said input/output device and said second computer system.

8. The computer-based information handling system according to claim 1 wherein said input/output device is a universal serial bus device.

9. The computer-based information handling system according to claim 8 wherein said input/output device is a composite universal serial bus device implementing pointing and storage functions.

10. A method for transferring data from a first computer system to a second computer system, comprising the steps of:
   connecting an input/output device of said first computer system, said input/output device comprising memory for storage of machine readable data contained within said input/output device, said input/output device further being operable as a pointing device to control a visible position indicator on a display of said first computer system;

transferring said data of the first computer system to said memory contained within said input/output device;

disconnecting said input/output device from said first computer system and connecting said input/output device to said second computer system, said input/output device being operable as a pointing device to control a visible position indicator on a display of said second computer system; and transferring the data contained in said memory of said input/output device to said second computer system.

11. The method of claim 10 wherein the step of transferring said data of the first computer system to the memory contained within said input/output device is performed using a standard disk write operation and said step of transferring the data contained in the memory of said input/output device to said second computer system is performed using a standard disk read operation.

12. The method of claim 10 wherein the step of transferring said data of the first computer system to the memory contained within said input/output device is performed using an operation standard for a computer clipboard memory resource and said step of transferring the data contained in the memory of said input/output device to said second computer system is performed using an operation standard for a computer clipboard memory resource.

13. A method of providing pointer input and data storage for a plurality of computer systems, comprising:

configuring a first computer system to enable data communication between said first computer system and a input/output device, said input/output device comprising memory for storage of machine readable data contained within said input/output device, said input/output device further being operable as a pointing device to control a visible position indicator on a display of said first computer system;

configuring a second computer system to disable data communication between said second computer system and said input/output device;

transferring data from the first computer system to said memory contained within said input/output device;

configuring said first computer system to disable data communication between said first computer system and said input/output device;

configuring said second computer system to enable data communication between said second computer system and said input/output device; and transferring the data contained in said memory of said input/output device to said second computer system.

14. The method of claim 13 wherein the step of transferring data from the first computer system to the memory contained within said input/output device is performed using a standard disk write operation and said step of transferring the data contained in the memory of said input/output device to the second computer system is performed using a standard disk read operation.

15. The method of claim 13 wherein the step of transferring data from the first computer system to the memory contained within said input/output device is performed using a standard clipboard memory operation and said step of transferring the data contained in the memory of said input/output device to the second computer system is performed using a standard clipboard memory operation.

16. The method of claim 13 wherein said input/output device is in communication with said first computer system and said second computer system via a wireless link.

17. An article of manufacture, comprising:

a computer useable medium having a computer readable code means embodied in said medium for providing pointer input and data storage for a plurality of computer systems, the computer readable program code means in said article of manufacture comprising:

computer readable program code means for configuring a first computer system to enable data communication between said first computer system and a input/output device, said input/output device comprising memory for storage of machine readable data contained within said input/output device, said input/output device further being operable as a pointing device to control a visible position indicator on a display of said first computer system;

computer readable program code means for configuring a second computer system to disable data communication between said second computer system and said input/output device;

computer readable program code means for transferring data from the first computer system to said memory contained within said input/output device;

computer readable program code means for configuring said first computer system to disable data communication between said first computer system and said input/output device;

computer readable program code means for configuring said second computer system to enable data communication between said second computer system and said input/output device; and computer readable program code means for transferring the data contained in said memory of said input/output device to said second computer system.

18. A program storage device readable by a machine, tangibly embodying a program of instructions executable by the machine to perform method steps for providing pointer input and data storage for a plurality of computer systems, said method steps comprising:

configuring a first computer system to enable data communication between said first computer system and a input/output device, said input/output device comprising memory for storage of machine readable data contained within said input/output device, said input/output device further being operable as a pointing device to control a visible position indicator on a display of said first computer system;

configuring a second computer system to disable data communication between said second computer system and said input/output device;

transferring data from the first computer system to said memory contained within said input/output device;

configuring said first computer system to disable data communication between said first computer system and said input/output device;

configuring said second computer system to enable data communication between said second computer system and said input/output device; and transferring the data contained in said memory of said input/output device to said second computer system.

* * * * *